No. 870,097. PATENTED NOV. 5, 1907.
T. G. & A. P. HARRYMAN.
WRENCH.
APPLICATION FILED JAN. 26, 1907.

Witnesses
T. P. Britt
M. De Grange

Inventors
T. G. Harryman
A. P. Harryman
By Swift & Co.
Attorneys

UNITED STATES PATENT OFFICE.

THOMAS G. HARRYMAN AND ALFRED P. HARRYMAN, OF BOX, OKLAHOMA TERRITORY.

WRENCH.

No. 870,097.      Specification of Letters Patent.      Patented Nov. 5, 1907.

Application filed January 26, 1907. Serial No. 354,302.

*To all whom it may concern:*

Be it known that we, THOMAS G. HARRYMAN and ALFRED P. HARRYMAN, citizens of the United States, residing at Box, in the county of Cleveland and Territory of Oklahoma, have invented a new and useful Wrench; and we do hereby declare the following to be a full, clear, and exact description of the invention, such as will enable others skilled in the art to which it appertains to make and use the same.

The invention relates to wrenches, and has for its object to provide a simple, inexpensive and durable device of this character having means for adjusting the jaws thereof, in a very quick and simple manner.

With these and other objects in view the invention consists in the construction and novel arrangement of parts, hereinafter described and shown and pointed out in the appended claims.

Figure 1:
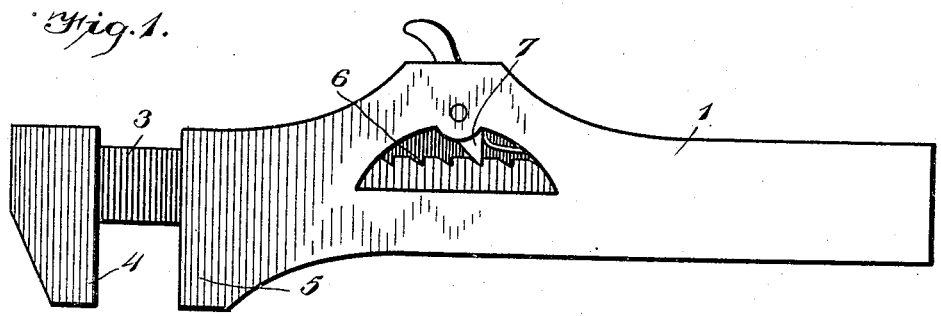
Figure 2:
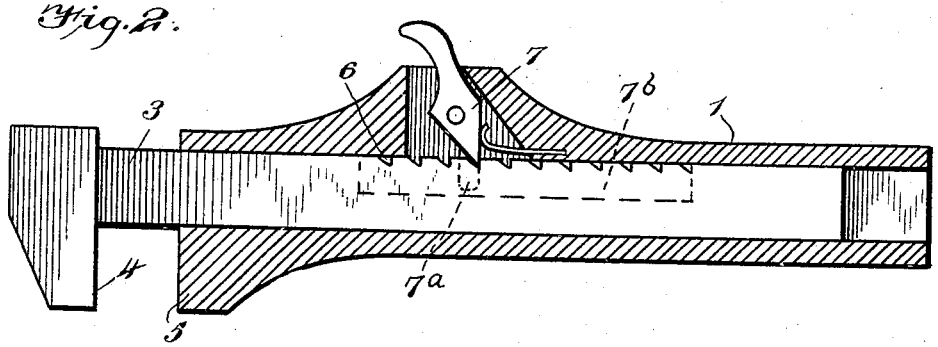
Figure 3:
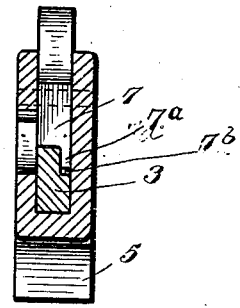
Figure 4:

In the drawings forming part of this specification and in which like numerals of reference designate corresponding parts, Figure 1 is a side elevation of a wrench constructed in accordance with this invention. Fig. 2 is a longitudinal sectional view. Fig. 3 is a cross-sectional view, showing the spring-actuated dog in edge elevation. Fig. 4 is a top plan view of the movable jaw and its shank.

Referring to the drawings 1 designates the handle of a wrench formed of one piece having an opening therein, for the reception of a shank 3 of the adjustable jaw 4. The adjustable jaw 4 coöperates with the stationary jaw 5, which is formed integral with the handle.

The shank 3 is provided with ratchet teeth 6 which are engaged by a spring-actuated dog 7. When it is desired to adjust the jaws of the wrench, the dog 7 is pressed downwardly which releases the jaw 4 whereby the same is then enabled to be set at a desired adjustment.

The dog 7 is provided with a depending lug $7^a$ which projects into an elongated recess $7^b$, of the shank of the movable jaw, so as to prevent removal of the said shank as will be clearly manifest.

It will be seen that the wrench is exceedingly simple, strong and durable, that the jaws can be adjusted in an instant.

What I claim is:

1. A wrench, comprising an outer movable jaw having a shank, a rigid jaw having a hollow handle to receive said shank, said shank having an elongated recess therein, a spring actuated dog pivotally carried by said hollow handle, said dog having means to engage said elongated recess to prevent the removal of the said shank, said shank having, upon its upper face, a plurality of notches to be engaged by said spring-actuated dog.

2. A wrench comprising an outer movable jaw, having a shank, a rigid jaw having a hollow handle to receive said shank, said shank having an elongated recess therein, a spring actuated dog having a depending lug designed to enter said elongated recess to prevent removal of the shank, said shank having upon its upper face, a plurality of notches to be engaged by said spring-actuated dog.

3. A wrench comprising an outer movable jaw having a shank, a rigid jaw having a hollow handle to receive said shank, said hollow handle being provided with an enlargement, an opening therein communicating with the hollow portion of the handle, said shank having an elongated recess therein and a plurality of notches in its upper surface, a spring-actuated dog, pivotally mounted in the opening of the enlargement and designed to engage the said notches to hold the shank in an adjusted position, said spring-actuated dog having a depending lug, entering the said elongated recess to prevent removal of the movable jaw and its shank.

In testimony whereof we have signed our name to this specification in the presence of two subscribing witnesses.

THOMAS G. HARRYMAN.
                         ALFRED P. HARRYMAN.

Witnesses:
    J. E. WHEELER,
    CHAS. DORE.